US009969841B2

(12) United States Patent
Hwang et al.

(10) Patent No.: US 9,969,841 B2
(45) Date of Patent: *May 15, 2018

(54) COPOLYCARBONATE AND COMPOSITION COMPRISING THE SAME

(71) Applicant: LG CHEM, LTD., Seoul (KR)

(72) Inventors: Young Young Hwang, Daejeon (KR); Hyong Min Bahn, Daejeon (KR); Jung Jun Park, Daejeon (KR); Moo Ho Hong, Daejeon (KR); Ki Jae Lee, Daejeon (KR); Byoung Kyu Chun, Daejeon (KR); Un Ko, Daejeon (KR); Young Wook Son, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/025,176

(22) PCT Filed: Nov. 16, 2015

(86) PCT No.: PCT/KR2015/012295
§ 371 (c)(1),
(2) Date: Mar. 25, 2016

(87) PCT Pub. No.: WO2016/089027
PCT Pub. Date: Jun. 9, 2016

(65) Prior Publication Data
US 2016/0297926 A1 Oct. 13, 2016

(30) Foreign Application Priority Data

Dec. 4, 2014 (KR) .......................... 10-2014-0173005
Jul. 31, 2015 (KR) .......................... 10-2015-0109123
Nov. 13, 2015 (KR) .......................... 10-2015-0159656

(51) Int. Cl.
C08G 64/08 (2006.01)
C08G 77/448 (2006.01)
C08G 64/18 (2006.01)
C08G 64/22 (2006.01)
C08G 64/30 (2006.01)
C08L 69/00 (2006.01)
C08G 77/12 (2006.01)
C08G 77/38 (2006.01)

(52) U.S. Cl.
CPC ........... C08G 64/186 (2013.01); C08G 64/18 (2013.01); C08G 64/22 (2013.01); C08G 64/30 (2013.01); C08G 64/307 (2013.01); C08G 77/448 (2013.01); C08L 69/00 (2013.01); C08G 77/12 (2013.01); C08G 77/38 (2013.01)

(58) Field of Classification Search
CPC .............. C08G 77/448; C08G 64/186
See application file for complete search history.

(56) References Cited

U.S. PATENT DOCUMENTS

| 3,819,744 | A |   | 6/1974  | Buechner et al. |
| 5,137,949 | A |   | 8/1992  | Paul et al. |
| 5,324,454 | A |   | 6/1994  | Takata et al. |
| 5,380,795 | A | * | 1/1995  | Gosens ............... C08L 51/04 525/147 |
| 5,455,310 | A |   | 10/1995 | Hoover et al. |
| 5,502,134 | A |   | 3/1996  | Okamoto et al. |
| 5,530,083 | A | * | 6/1996  | Phelps ............... C08G 64/186 525/464 |
| 5,608,026 | A |   | 3/1997  | Hoover et al. |
| 5,783,651 | A |   | 7/1998  | König et al. |
| 5,932,677 | A |   | 8/1999  | Hoover et al. |
| 6,001,929 | A |   | 12/1999 | Nodera et al. |
| 6,252,013 | B1 |   | 6/2001  | Banach et al. |
| 6,281,286 | B1 |   | 8/2001  | Chorvath et al. |
| 6,780,956 | B2 |   | 8/2004  | Davis |
| 7,135,538 | B2 |   | 11/2006 | Glasgow et al. |
| 7,332,559 | B2 |   | 2/2008  | Hong et al. |
| 7,365,125 | B2 | * | 4/2008  | Govaerts ............ C08L 69/00 525/101 |
| 7,432,327 | B2 |   | 10/2008 | Glasgow |
| 7,498,401 | B2 |   | 3/2009  | Agarwal |
| 7,524,919 | B2 |   | 4/2009  | Hoover et al. |
| 7,691,304 | B2 |   | 4/2010  | Agarwal et al. |
| 7,709,562 | B2 | * | 5/2010  | Li ..................... C08G 64/14 524/108 |
| 7,709,581 | B2 |   | 5/2010  | Glasgow et al. |
| 7,718,733 | B2 |   | 5/2010  | Juikar et al. |
| 8,030,379 | B2 |   | 10/2011 | Nodera et al. |
| 8,084,134 | B2 |   | 12/2011 | Malinoski et al. |
| 8,124,683 | B2 |   | 2/2012  | Jung et al. |

(Continued)

FOREIGN PATENT DOCUMENTS

| CN | 101124282 A | 2/2008 |
| CN | 101585961 A | 11/2009 |
| CN | 102471474 A | 5/2012 |
| CN | 102933657 A | 2/2013 |
| CN | 103443201 A | 12/2013 |
| CN | 103827217 A | 5/2014 |
| CN | 103958573 A | 7/2014 |
| CN | 104066773 A | 9/2014 |
| CN | 104321382 A | 1/2015 |
| CN | 105899576 A | 8/2016 |
| EP | 0284865 A2 | 3/1988 |
| EP | 0685507 B1 | 10/1998 |

(Continued)

OTHER PUBLICATIONS

Chemical Abstract of US2016/0251481, Mar. 2016, 3 pages.
Chemical Abstract registry No. 163617-O0-3, Jun. 1995, 1 page.

Primary Examiner — Marc S Zimmer
(74) Attorney, Agent, or Firm — Dentons US LLP

(57) ABSTRACT

The present invention relates to a copolycarbonate and a molded article comprising the same. The copolycarbonates according to the present invention has a structure in which a specific siloxane compound is introduced in a main chain of the polycarbonate, and has effects of improving impact strength at room temperature, impact strength at low temperature, and melt index properties.

13 Claims, No Drawings

(56) References Cited

U.S. PATENT DOCUMENTS

| | | |
|---|---|---|
| 8,389,648 B2 | 3/2013 | Adoni et al. |
| 8,466,249 B2 | 6/2013 | Gallucci et al. |
| 8,552,096 B2 | 10/2013 | Li et al. |
| 8,912,290 B2 | 12/2014 | Huggins et al. |
| 8,933,186 B2 | 1/2015 | Bahn et al. |
| 8,962,780 B2 | 2/2015 | Higaki et al. |
| 8,981,017 B2 | 3/2015 | Ishikawa |
| 9,062,164 B2 | 6/2015 | Kim et al. |
| 9,080,021 B2 | 7/2015 | Ishikawa et al. |
| 9,102,832 B2 | 8/2015 | Sybert et al. |
| 9,255,179 B2 * | 2/2016 | Park ................ C08G 64/1666 |
| 2003/0027905 A1 | 2/2003 | Mahood et al. |
| 2003/0065122 A1 | 4/2003 | Davis |
| 2004/0200303 A1 | 10/2004 | Inoue et al. |
| 2006/0148986 A1 | 7/2006 | Glasgow et al. |
| 2007/0093629 A1 | 4/2007 | Silva et al. |
| 2007/0135569 A1 | 6/2007 | De Rudder |
| 2007/0241312 A1 | 10/2007 | Hikosaka |
| 2007/0258412 A1 | 11/2007 | Schilling et al. |
| 2008/0015289 A1 | 1/2008 | Siripurapu |
| 2008/0081895 A1 | 4/2008 | Lens et al. |
| 2008/0230751 A1 | 9/2008 | Li et al. |
| 2009/0087761 A1 | 4/2009 | Fukushima et al. |
| 2009/0326183 A1 | 12/2009 | Schultz et al. |
| 2010/0233603 A1 | 9/2010 | Hikosaka |
| 2012/0123034 A1 | 5/2012 | Morizur et al. |
| 2012/0251750 A1 | 10/2012 | Sybert et al. |
| 2012/0252985 A1 | 10/2012 | Rosenquist et al. |
| 2012/0283393 A1 | 11/2012 | Ishikawa |
| 2013/0035441 A1 | 2/2013 | De Brouwer et al. |
| 2013/0082222 A1 | 4/2013 | Aoki |
| 2013/0186799 A1 | 7/2013 | Stam et al. |
| 2013/0190425 A1 | 7/2013 | Zhu et al. |
| 2013/0261235 A1 * | 10/2013 | Minemura ............. C08G 77/42 524/165 |
| 2013/0267665 A1 | 10/2013 | Huggins et al. |
| 2013/0274392 A1 | 10/2013 | Morizur et al. |
| 2013/0289224 A1 | 10/2013 | Bae et al. |
| 2013/0309474 A1 | 11/2013 | Peek et al. |
| 2013/0313493 A1 | 11/2013 | Wen et al. |
| 2013/0317142 A1 | 11/2013 | Chen et al. |
| 2013/0317146 A1 | 11/2013 | Li et al. |
| 2013/0317148 A1 * | 11/2013 | Zheng ...................... C08K 3/22 524/116 |
| 2013/0317150 A1 | 11/2013 | Wan et al. |
| 2013/0331492 A1 | 12/2013 | Sharma |
| 2014/0106208 A1 | 4/2014 | Ishikawa et al. |
| 2014/0148559 A1 | 5/2014 | Kim et al. |
| 2014/0178943 A9 | 6/2014 | Shibuya et al. |
| 2014/0179843 A1 | 6/2014 | van der Mee et al. |
| 2014/0256888 A1 * | 9/2014 | Ishikawa ................ C08L 83/10 525/464 |
| 2014/0323623 A1 | 10/2014 | Miyake et al. |
| 2015/0057423 A1 | 2/2015 | Kim et al. |
| 2015/0175802 A1 | 6/2015 | Sybert et al. |
| 2015/0183985 A1 * | 7/2015 | Hong ...................... C08L 69/00 524/441 |
| 2015/0197633 A1 | 7/2015 | van der Mee et al. |
| 2015/0210854 A1 | 7/2015 | Aoki |
| 2015/0218371 A1 | 8/2015 | Lee et al. |
| 2015/0307706 A1 | 10/2015 | Rosenquist et al. |
| 2015/0315380 A1 | 11/2015 | Bahn et al. |
| 2015/0344623 A1 | 12/2015 | Park et al. |
| 2015/0368484 A1 * | 12/2015 | Shishaku ............. C09D 133/10 427/385.5 |
| 2016/0002410 A1 | 1/2016 | Iyer et al. |
| 2016/0083527 A1 * | 3/2016 | Mittal ..................... C08L 83/10 525/477 |
| 2016/0122477 A1 | 5/2016 | Rhee et al. |
| 2016/0251481 A1 | 9/2016 | Hwang et al. |
| 2016/0297926 A1 | 10/2016 | Hwang et al. |
| 2016/0326312 A1 | 11/2016 | Park et al. |
| 2016/0326313 A1 | 11/2016 | Son et al. |
| 2016/0326314 A1 | 11/2016 | Son et al. |
| 2016/0326321 A1 | 11/2016 | Park et al. |
| 2016/0369047 A1 | 12/2016 | Hwang et al. |
| 2016/0369048 A1 | 12/2016 | Park et al. |

FOREIGN PATENT DOCUMENTS

| | | |
|---|---|---|
| EP | 0524731 B1 | 3/2002 |
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08-234468 A | 9/1996 |
| JP | 10-204179 A | 8/1998 |
| JP | 2000-280414 A | 10/2000 |
| JP | 2000-302962 A | 10/2000 |
| JP | 2002-220526 A | 8/2002 |
| JP | 3393616 B2 | 4/2003 |
| JP | 3457805 B2 | 10/2003 |
| JP | 2004-035587 A | 2/2004 |
| JP | 2004-536193 A | 12/2004 |
| JP | 2008-248262 A | 10/2008 |
| JP | 2011-236287 A | 11/2011 |
| JP | 2012-116915 A | 6/2012 |
| JP | 2012-153824 A | 8/2012 |
| JP | 2012-246430 A | 12/2012 |
| JP | 5290483 B2 | 9/2013 |
| JP | 5315246 B2 | 10/2013 |
| JP | 2013-234298 A | 11/2013 |
| JP | 2013-238667 A | 11/2013 |
| JP | 2014-080462 A | 5/2014 |
| JP | 2014-080496 A | 5/2014 |
| JP | 5547953 B2 | 7/2014 |
| JP | 6049113 B2 | 12/2016 |
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |
| KR | 1020080083278 A | 9/2008 |
| KR | 10-2009-0033093 A | 4/2009 |
| KR | 10-1007451 B1 | 1/2011 |
| KR | 2011-0068682 A | 6/2011 |
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |

(56) References Cited

FOREIGN PATENT DOCUMENTS

| KR | 2014-0084858 A | 7/2014 |
|---|---|---|
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |
| KR | 10-1522321 B1 | 5/2015 |
| KR | 2015-0057275 A | 5/2015 |
| KR | 10-2015-0119823 A | 10/2015 |
| KR | 10-1563269 B1 | 10/2015 |
| KR | 2015-0134457 A | 12/2015 |
| TW | 201241043 A | 10/2012 |
| WO | 2012060516 A1 | 5/2012 |
| WO | 2013/051557 A1 | 4/2013 |
| WO | 2013-058214 A1 | 4/2013 |
| WO | 2013/073709 A1 | 5/2013 |
| WO | 2013/100606 A1 | 7/2013 |
| WO | 2013-115538 A1 | 8/2013 |
| WO | 2013/175445 A2 | 11/2013 |
| WO | 2013/175455 A1 | 11/2013 |
| WO | 2014042252 A1 | 3/2014 |
| WO | 2014/058033 A1 | 4/2014 |
| WO | 2014/119827 A1 | 8/2014 |
| WO | 2014/139110 A1 | 9/2014 |
| WO | 2014-144673 A1 | 9/2014 |
| WO | 2015/011669 A2 | 1/2015 |
| WO | 2015/015445 A2 | 2/2015 |
| WO | WO 2015/041441 * | 3/2015 |

* cited by examiner

COPOLYCARBONATE AND COMPOSITION COMPRISING THE SAME

CROSS-REFERENCE TO RELATED APPLICATION(S)

This application is a National Stage Application of International Application No. PCT/KR2015/012295, filed on Nov. 16, 2015, which claims the benefit of Korean Patent Application No. 10-2014-0173005 filed on Dec. 4, 2014, Korean Patent Application No. 10-2015-0109123 filed on Jul. 31, 2015 and Korean Patent Application No. 10-2015-0159656 filed on Nov. 13, 2015, all of which are hereby incorporated by reference in their entirety for all purposes as if fully set forth herein.

TECHNICAL FIELD

The present invention relates to a copolycarbonate and a composition comprising the same, and more specifically to a copolycarbonate being economically produced, and having improved impact strength at room temperature, impact strength at low temperature and melt index, and to a composition comprising the same.

BACKGROUND OF ART

Polycarbonate resins are prepared by condensation-polymerization of an aromatic diol such as bisphenol A with a carbonate precursor such as phosgene and have excellent impact strength, dimensional stability, heat resistance and transparency. Thus, the polycarbonate resins have application in a wide range of uses, such as exterior materials of electrical and electronic products, automobile parts, building materials, and optical components.

Recently, in order to apply these polycarbonate resins to more various fields, many studies have been made to obtain desired physical properties by copolymerizing two or more aromatic diol compounds having different structures from each other and introducing units having different structures in a main chain of the polycarbonate.

Especially, studies for introducing a polysiloxane structure in a main chain of the polycarbonate have been undergone, but most of these technologies have disadvantages in that production costs are high, and when chemical resistance or impact strength, particularly impact strength at low temperature is increased, melt index or the like is conversely lowered.

Given the above circumstances, the present inventors have conducted intensive studies to overcome the above-mentioned disadvantages encountered with the prior arts and develop a copolycarbonate having improved impact strength at room temperature, impact strength at low temperature and melt index properties, and found that a copolycarbonate in which a specific siloxane compound is introduced in a main chain of the polycarbonate as described below satisfies the above-described properties. The present invention has been completed on the basis of such a finding.

DETAILED DESCRIPTION OF THE INVENTION

Technical Problem

It is an object of the present invention to provide a copolycarbonate having improved impact strength at room temperature, impact strength at low temperature and melt index properties.

It is another object of the present invention to provide a polycarbonate composition comprising the above-mentioned copolycarbonate and polycarbonate.

It is a further object of the present invention to provide an article comprising the above-mentioned copolycarbonate and polycarbonate composition.

Technical Solution

In order to achieve the above objects, the present invention provides a copolycarbonate comprising:

1) two or more kinds of repeating units selected from the group consisting of repeating units represented by the following Chemical Formulae 1 to 3, and 2) a repeating unit represented by the following Chemical Formula 4, wherein the copolycarbonate has a weight average molecular weight of 1,000 to 100,000 g/mol:

[Chemical Formula 1]

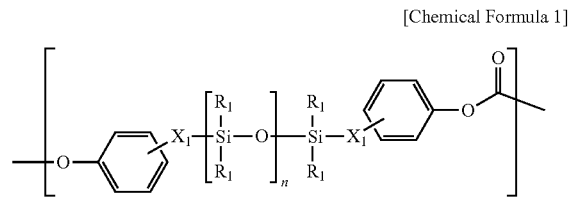

in the Chemical Formula 1, each of $X_1$ is independently $C_{1\text{-}10}$ alkylene, each of $R_1$ is independently hydrogen; $C_{1\text{-}15}$ alkyl unsubstituted or substituted with oxiranyl, oxiranyl-substituted $C_{1\text{-}10}$ alkoxy, or $C_{6\text{-}20}$ aryl; halogen; $C_{1\text{-}10}$ alkoxy; allyl; $C_{1\text{-}10}$ haloalkyl; or $C_{6\text{-}20}$ aryl, and n is an integer of 10 to 200,

[Chemical Formula 2]

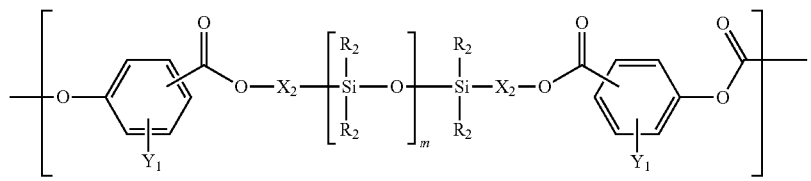

in the Chemical Formula 2, each of $X_2$ is independently $C_{1\text{-}10}$ alkylene, each of $Y_1$ is independently hydrogen, $C_{1\text{-}6}$ alkyl, halogen, hydroxy, $C_{1\text{-}6}$ alkoxy, or $C_{6\text{-}20}$ aryl, each of $R_2$ is independently hydrogen; $C_{1\text{-}15}$ alkyl unsubstituted or substituted with oxiranyl, oxiranyl-substituted $C_{1\text{-}10}$ alkoxy, or $C_{6\text{-}20}$ aryl; halogen; $C_{1\text{-}10}$ alkoxy; allyl; $C_{1\text{-}10}$ haloalkyl; or $C_{6\text{-}20}$ aryl, and m is an integer of 10 to 200,

[Chemical Formula 3]

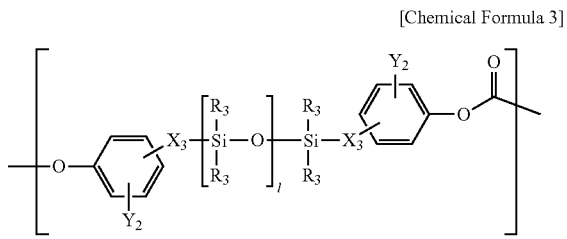

in the Chemical Formula 3,
each of $X_3$ is independently $C_{1-10}$ alkylene,
each of $Y_2$ is independently $C_{1-10}$ alkoxy,
each of $R_3$ is independently hydrogen; or $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
l is an integer of 10 to 200,

[Chemical Formula 4]

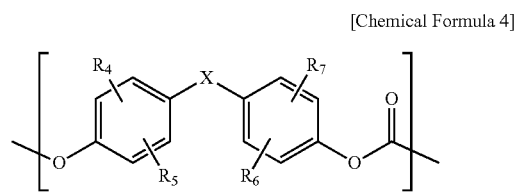

in the Chemical Formula 4,
X is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO, and
$R_4$, $R_5$, $R_6$ and $R_7$ are each independently hydrogen, $C_{1-10}$ alkyl, $C_{1-10}$ alkoxy, or halogen.

The copolycarbonate according to the present invention comprises a polycarbonate structure formed by the repeating units represented by the Chemical Formula 4. Generally, the polycarbonate has excellent overall mechanical and physical properties, but exhibits reduced impact strength at room temperature, impact strength at low temperature and melt index properties. Therefore, in order to improve these properties, there is a need to include other structures in addition to the polycarbonate structure.

Accordingly, the copolycarbonate according to the present invention has a structure in which a polysiloxane formed of two or more kinds of repeating units selected from the group consisting of repeating units represented by Chemical Formulae 1 to 3, in addition to the repeating unit represented by Chemical Formula 4, is copolymerized with a polycarbonate. Thus, the copolycarbonate has remarkable effects of improving impact strength at room temperature, impact strength at low temperature, and melt index properties, as compared with a conventional polycarbonate.

In particular, the copolycarbonate according to the present invention may comprise a repeating unit selected from the group consisting of the repeating units represented by Chemical Formulae 1 to 3, and has a characteristic that a combination of two or more kinds thereof is included. According to examples and comparative examples to be described later, it could be confirmed that a case of comprising two or more kinds of repeating units exhibited significantly increased impact strength at room temperature, impact strength at low temperature and melt index properties as compared with a case of comprising a single kind of repeating unit. This is because the improvement of physical properties results from the mutual complementary action of the respective repeating units.

Hereinafter, the present invention will be described in more detail.

Two or More Kinds of Repeating Units Selected from the Group Consisting of Repeating Units Represented by the Following Chemical Formulae 1 to 3

The copolycarbonate according to the present invention comprises two or more kind of repeating units selected from the group consisting of repeating units represented by the following Chemical Formulae 1 to 3.

Specifically, the 'two or more kinds of repeating units' as used herein refers to comprising 1) the repeating unit represented by Chemical Formula 1 and the repeating unit represented by Chemical Formula 2, 2) the repeating unit represented by Chemical Formula 1 and the repeating unit represented by Chemical Formula 3, or 3) the repeating unit represented by Chemical Formula 2 and the repeating unit represented by Chemical Formula 3. Specific examples of the above combination will be shown in the examples to be described later.

The weight ratio between the two or more kinds of repeating units may be 1:99 to 99:1. The weight ratio is preferably 3:97 to 97:3, 5:95 to 95:5, 10:90 to 90:10, or 15:85 to 85:15, and more preferably 20:80 to 80:20.

In the Chemical Formula 1, each of $X_1$ is independently preferably $C_{2-10}$ alkylene, more preferably $C_{2-4}$ alkylene and most preferably propane-1,3-diyl.

Also, preferably, each of $R_1$ represents independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. More preferably, each of $R_1$ represents independently $C_{1-10}$ alkyl, more preferably $C_{1-6}$ alkyl, more preferably $C_{1-3}$ alkyl, and most preferably methyl.

Further, preferably, n is i) an integer of 30 to 60, or ii) an integer of not less than 20, not less than 25, or not less than 30, and not more than 40, or not more than 35, or iii) an integer not less than 50, or not less than 55; and not more than 70, not more than 65, or not more than 60.

Further, the Chemical Formula 1 is preferably represented by the following Chemical Formula 1-1:

[Chemical Formula 1-1]

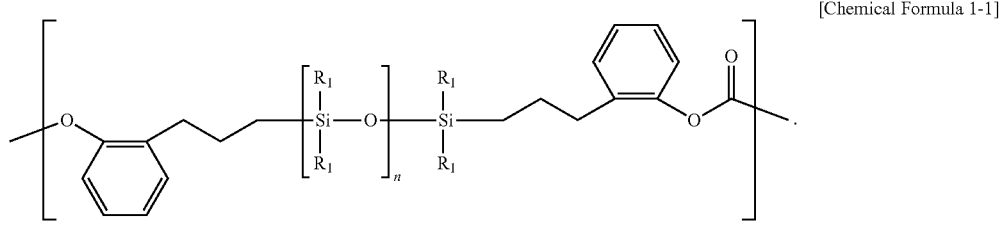

In the Chemical Formula 2, each of $X_2$ is independently preferably $C_{2-6}$ alkylene and more preferably isobutylene.

Also preferably, $Y_1$ is hydrogen.

Further, each of $R_2$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. More preferably, each of $R_2$ is independently $C_{1-10}$ alkyl, more preferably $C_{1-6}$ alkyl, more preferably $C_{1-3}$ alkyl, and most preferably methyl.

Further, preferably, m is i) an integer of 30 to 60, or ii) an integer of not less than 20, not less than 25, or not less than 30, and not more than 40, or not more than 35, or iii) an integer not less than 50, or not less than 55, and not more than 70, not more than 65, or not more than 60.

Further, the Chemical Formula 2 is preferably represented by the following Chemical Formula 2-1:

[Chemical Formula 2-1]

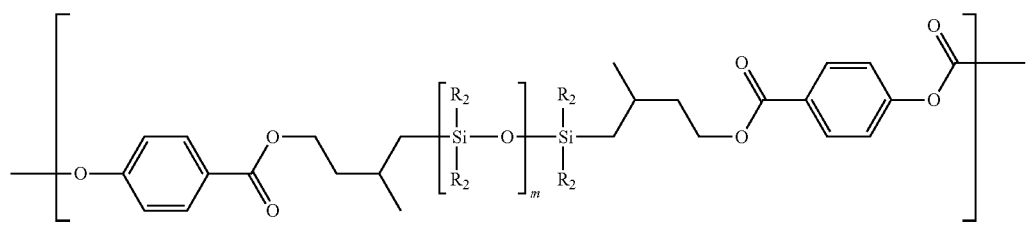

In the Chemical Formula 3, each of $X_3$ is independently preferably $C_{2-10}$ alkylene, more preferably $C_{2-4}$ alkylene and most preferably propane-1,3-diyl.

Also, $Y_2$ is preferably $C_{1-6}$ alkoxy, more preferably $C_{1-4}$ alkoxy and most preferably methoxy.

In addition, each of $R_3$ is independently preferably hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. More preferably, each of $R_3$ is independently $C_{1-10}$ alkyl, more preferably $C_{1-6}$ alkyl, more preferably $C_{1-3}$ alkyl, and most preferably methyl.

Further, preferably, l is i) an integer of 30 to 60, or ii) an integer of not less than 20, not less than 25, or not less than 30, and not more than 40, or not more than 35, or iii) an integer not less than 50, or not less than 55, and not more than 70, not more than 65, or not more than 60.

Further, the Chemical Formula 3 is preferably represented by the following Chemical Formula 3-1:

Preferably, the repeating units represented by Chemical Formulae 1 to 3 are derived from siloxane compounds represented by the following Chemical Formulae 1-2, 2-2 and 3-2, respectively:

[Chemical Formula 1-2]

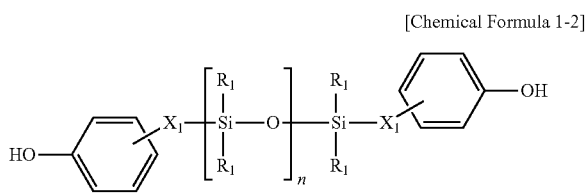

in the Chemical Formula 1-2, $X_1$, $R_1$ and n are the same as previously defined in Chemical Formula 1,

[Chemical Formula 2-2]

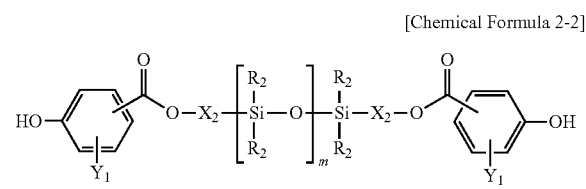

in the Chemical Formula 2-2, $X_2$, $Y_1$, $R_2$ and m are the same as previously defined in Chemical Formula 2,

[Chemical Formula 3-1]

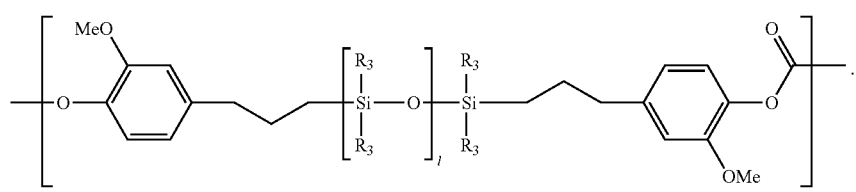

[Chemical Formula 3-2]

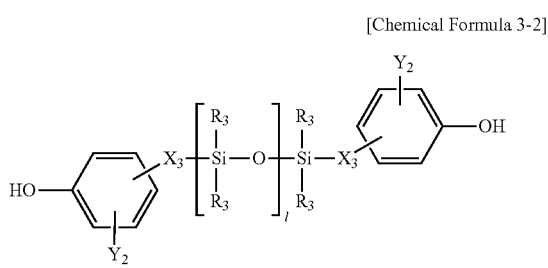

in the Chemical Formula 3-2, $X_3$, $Y_2$, $R_3$ and $l$ are the same as previously defined in Chemical Formula 3.

As used herein, 'derived from a siloxane compound' means that a hydroxy group of the respective siloxane compound and a carbonate precursor are reacted to form the repeating unit represented by Chemical Formulae 1 to 3.

The carbonate precursor used herein may include one or more selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl)carbonate, phosgene, triphosgene, diphosgene, bromophosgene and bishaloformate. Preferably, triphosgene or phosgene may be used.

The compounds represented by Chemical Formulae 1-2, 2-2 and 3-2 can be prepared by the method as shown in the following Reaction Schemes 1 to 3:

[Reaction Scheme 1]

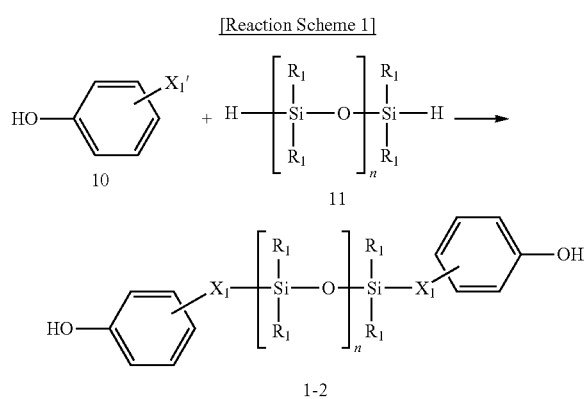

in the Reaction Scheme 1, $X_1'$ is $C_{2-10}$ alkenyl, and $X_1$, $R_1$ and n are the same as previously defined in Chemical Formula 1.

[Reaction Scheme 2]

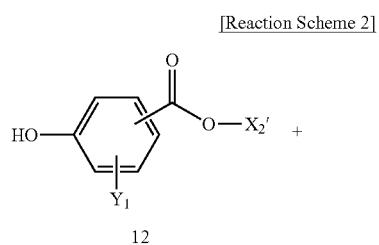

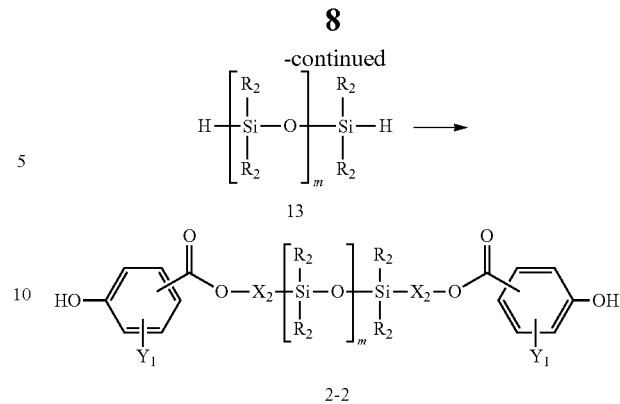

in the Reaction Scheme 2, $X_2'$ is $C_{2-10}$ alkenyl, and $X_2$, $Y_1$, $R_2$ and m are the same as previously defined in Chemical Formula 2.

[Reaction Scheme 3]

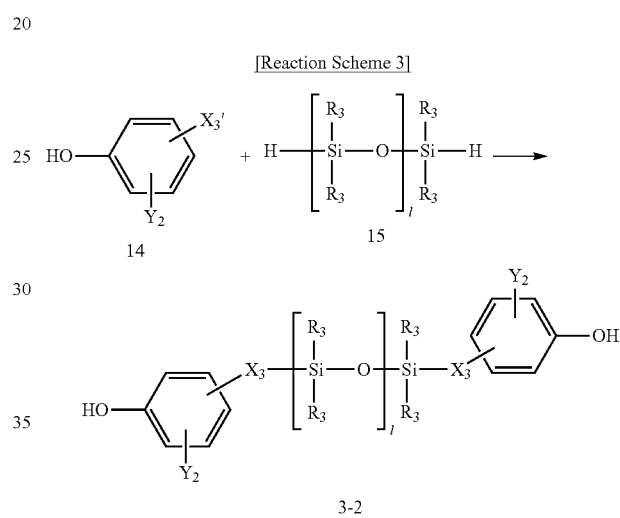

in the Reaction Scheme 3, $X_3'$ is $C_{2-10}$ alkenyl, and $X_3$, $Y_1$, $R_3$ and $l$ are the same as previously defined in Chemical Formula 3.

In Reaction Schemes 1 to 3, the reaction is preferably conducted in the presence of a metal catalyst.

As the metal catalyst, a Pt catalyst is preferably used. The Pt catalyst used herein may include one or more selected from the group consisting of Ashby catalyst, Karstedt catalyst, Lamoreaux catalyst, Speier catalyst, $PtCl_2(COD)$, $PtCl_2$ (benzonitrile)$_2$ and $H_2PtBr_6$. The metal catalyst may be used in an amount of not less than 0.001 parts by weight, not less than 0.005 parts by weight, or not less than 0.01 parts by weight; and not more than 1 part by weight, not more than 0.1 part by weight, or not more than 0.05 part by weight, based on 100 parts by weight of the compounds represented by the Chemical Formulae 11, 13 or 15.

Further, the above reaction temperature is preferably 80 to 100° C. Further, the above reaction time is preferably 1 to 5 hours.

In addition, the compounds represented by Chemical Formulae 11, 13 or 15 can be prepared by reacting an organodisiloxane and an organocyclosiloxane in the presence of an acid catalyst, and n, m and $l$ may be adjusted by adjusting the amount of the reactants used. The reaction temperature is preferably 50 to 70° C. Also, the reaction time is preferably 1 to 6 hours.

The above organodisiloxane may include one or more selected from the group consisting of tetramethyldisiloxane, tetraphenyldisiloxane, hexamethyldisiloxane and hexaphenyldisiloxane. In addition, the above organocyclosiloxane may include, for example, organocyclotetrasiloxane. As one example thereof, octamethylcyclotetrasiloxane and octaphenylcyclotetrasiloxane and the like can be included.

The above organodisiloxane can be used in an amount of not less than 0.1 parts by weight, or not less than 2 parts by weight; and not more than 10 parts by weight or not more than 8 parts by weight, based on 100 parts by weight of the organocyclosiloxane.

The above acid catalyst that may be used herein includes one or more selected from the group consisting of $H_2SO_4$, $HClO_4$, $AlCl_3$, $SbCl_5$, $SnCl_4$ and acid clay (fuller's earth). Further, the acid catalyst may be used in an amount of not less than 0.1 parts by weight, not less than 0.5 parts by weight, or not less than 1 part by weight; and not more than 10 parts by weight, not more than 5 parts by weight or not more than 3 parts by weight, based on 100 parts by weight of the organocyclosiloxane.

In particular, by adjusting the content of the repeating units represented by Chemical Formulae 1 to 3, the physical properties of the copolycarbonate can be improved, and the weight ratio of the above repeating units corresponds to the weight ratio of siloxane compounds, for example, the siloxane compounds represented by Chemical Formulae 1-2, 2-2 and 3-2.

Repeating Unit Represented by Chemical Formula 4

The copolycarbonate according to the present invention comprises a repeating unit represented by Chemical Formula 4. The repeating unit represented by Chemical Formula 4 is formed by reacting the aromatic diol compound with the carbonate precursor.

In Chemical Formula 4, preferably $R_4$, $R_5$, $R_6$ and $R_7$ are each independently hydrogen, methyl, chloro, or bromo.

Further, X is preferably a linear or branched $C_{1-10}$ alkylene unsubstituted or substituted with phenyl, and more preferably methylene, ethane-1,1-diyl, propane-2,2-diyl, butane-2,2-diyl, 1-phenylethane-1,1-diyl, or diphenylmethylene. Further, preferably, X is cyclohexane-1,1-diyl, O, S, SO, $SO_2$, or CO.

Preferably, the repeating unit represented by Chemical Formula 4 may be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

As used herein, 'derived from aromatic diol compounds' means that a hydroxy group of the aromatic diol compound and a carbonate precursor are reacted to form the repeating unit represented by Chemical Formula 4.

For example, when bisphenol A, which is an aromatic diol compound, and triphosgene, which is a carbonate precursor, are polymerized, the repeating unit represented by Chemical Formula 4 is represented by the following Chemical Formula 4-1:

[Chemical Formula 4-1]

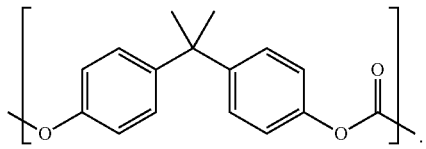

The carbonate precursor used herein is the same as those described in the carbonate precursor that can be used for the formation of the repeating units of Chemical Formulae 1 to 3 described above.

Copolycarbonate

The copolycarbonate according to the present invention comprises 1) two or more kinds of repeating units selected from the group consisting of repeating units represented by Chemical Formulae 1 to 3, and 2) a repeating unit represented by Chemical Formula 4. Preferably, the copolycarbonate is a random copolymer.

Preferably, the copolycarbonate according to the present invention has a weight average molecular weight (g/mol) of not less than 15,000, not less than 16,000, not less than 17,000, not less than 18,000, not less than 19,000, not less than 20,000, not less than 21,000, not less than 22,000, not less than 23,000, not less than 24,000, or not less than 25,000; and not more than 40,000, not more than 39,000, not more than 38,000, not more than 37,000, not more than 36,000, not more than 35,000, not more than 34,000, not more than 33,000, or not more than 32,000.

The copolycarbonate according to the present invention can be prepared by the preparation method comprising a step of polymerizing a composition comprising i) an aromatic diol compound, two or more compounds selected from the group consisting of a compound represented by Chemical Formula 1-1, a compound represented by Chemical Formula 2-1 and a compound represented by Chemical Formula 3-1, and ii) a carbonate precursor.

During the polymerization, two or more compounds selected from the group consisting of a compound represented by Chemical Formula 1-1, a compound represented by Chemical Formula 2-1 and a compound represented by Chemical Formula 3-1 can be used in an amount of not less than 0.1% by weight, not less than 0.5% by weight, not less than 1% by weight, or not less than 1.5% by weight; and not more than 20% by weight, not more than 10% by weight, not more than 7% by weight, not more than 5% by weight, or not more than 4% by weight, based on 100% by weight of the composition.

Further, the aromatic diol compound can be used in an amount of not less than 40% by weight, not less than 50% by weight, or not less than 55% by weight; and not more than 80% by weight, not more than 70% by weight, or not more than 65% by weight, based on 100% by weight of the composition.

Further, the carbonate precursor can be used in an amount of not less than 10% by weight, not less than 20% by weight, or not less than 30% by weight; and not more than 60% by weight, not more than 50% by weight, or not more than 40% by weight, based on 100% by weight of the composition.

Further, as the polymerization method, an interfacial polymerization method can be used as one example. In this case, there is an advantage in that the polymerization reaction can be made at low temperature and atmospheric pressure, and it is easy to adjust the molecular weight. The above interfacial polymerization is preferably conducted in the presence of an acid binder and an organic solvent. Furthermore, the above interfacial polymerization may comprise, for example, the steps of conducting pre-polymerization, then adding a coupling agent and again conducting polymerization. In this case, the copolycarbonate having a high molecular weight can be obtained.

The materials used in the interfacial polymerization are not particularly limited as long as they can be used in the polymerization of polycarbonates. The used amount thereof may be controlled as required.

The acid binding agent may include, for example, alkali metal hydroxides such as sodium hydroxide or potassium hydroxide, or amine compounds such as pyridine.

The organic solvent is not particularly limited as long as it is a solvent that can be usually used in the polymerization of polycarbonate. As one example, halogenated hydrocarbon such as methylene chloride or chlorobenzene can be used.

Further, during the interfacial polymerization, a reaction accelerator, for example, a tertiary amine compound such as triethylamine, tetra-n-butyl ammonium bromide and tetra-n-butylphosphonium bromide or a quaternary ammonium compound or a quaternary phosphonium compound may be further used for accelerating the reaction.

In the interfacial polymerization, the reaction temperature is preferably from 0 to 40° C. and the reaction time is preferably from 10 minutes to 5 hours. Further, during the interfacial polymerization reaction, pH is preferably maintained at 9 or more, or 11 or more.

In addition, the interfacial polymerization may be conducted by further comprising a molecular weight modifier. The molecular weight modifier may be added before the initiation of polymerization, during the initiation of polymerization, or after the initiation of polymerization.

As the above molecular weight modifier, mono-alkylphenol may be used. As one example, the mono-alkylphenol is one or more selected from the group consisting of p-tert-butylphenol, p-cumyl phenol, decyl phenol, dodecyl phenol, tetradecyl phenol, hexadecyl phenol, octadecyl phenol, eicosyl phenol, docosyl phenol and triacontyl phenol, and preferably p-tert-butylphenol. In this case, the effect of adjusting the molecular weight is great.

The above molecular weight modifier is contained, for example, in an amount of more not less 0.01 parts by weight, not less than 0.1 parts by weight, or not less than 1 part by weight; and not more than 10 parts by weight, not more than 6 parts by weight, or not more than 5 parts by weight, based on 100 parts by weight of the aromatic diol compound. Within this range, the required molecular weight can be obtained.

Polycarbonate Composition

In addition, the present invention provides a polycarbonate composition comprising the above-mentioned copolycarbonate and polycarbonate. The copolycarbonate may be used alone, but it can be used together with the polycarbonate as needed to control the physical properties of the copolycarbonate.

The above polycarbonate is distinguished from the copolycarbonate according to the present invention in that a polysiloxane structure is not introduced in a main chain of the polycarbonate.

Preferably, the above polycarbonate comprises a repeating unit represented by the following Chemical Formula 5:

[Chemical Formula 5]

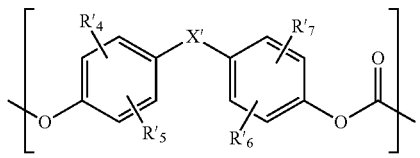

in the Chemical Formula 5, $R'_4$, $R'_5$, $R'_6$ and $R'_7$ are each independently hydrogen, $C_{1-10}$ alkyl, $C_{1-10}$ alkoxy, or halogen, X' is $C_{1-10}$ alkylene unsubstituted or substituted with phenyl, $C_{3-15}$ cycloalkylene unsubstituted or substituted with $C_{1-10}$ alkyl, O, S, SO, $SO_2$ or CO.

Further, preferably, the above polycarbonate has a weight average molecular weight of 15,000 to 35,000 g/mol. More preferably, the above weight average molecular weight (g/mol) is not less than 20,000, not less than 21,000, not less than 22,000, not less than 23,000, not less than 24,000, not less than 25,000, not less than 26,000, not less than 27,000, or not less than 28,000. Further, the above weight average molecular weight (g/mol) is not more than 34,000, not more than 33,000, or not more than 32,000.

The repeating unit represented by Chemical Formula 5 is formed by reacting the aromatic diol compound and the carbonate precursor. The aromatic diol compound and the carbonate precursor that can be used herein are the same as previously described for the repeating unit represented by Chemical Formula 4.

Preferably, $R'_4$, $R'_5$, $R'_6$, $R'_7$ and X' in Chemical Formula 5 are the same as previously described for $R_4$, $R_5$, $R_6$, $R_7$ and X in Chemical Formula 4, respectively.

Further, preferably, the repeating unit represented by Chemical Formula 5 is represented by the following Chemical Formula 5-1:

[Chemical Formula 5-1]

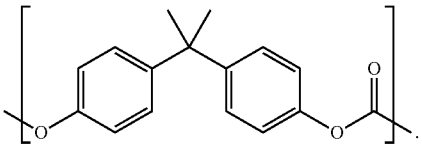

In the polycarbonate composition, the weight ratio of the copolycarbonate and the polycarbonate is preferably from 99:1 to 1:99, more preferably from 90:10 to 50:50, and most preferably from 80:20 to 60:40.

In addition, the present invention provides an article comprising the above-mentioned copolycarbonate or the polycarbonate composition.

Preferably, the above article is an injection molded article. In addition, the article may further comprise, for example, one or more selected from the group consisting of antioxidants, heat stabilizers, light stabilizers, plasticizers, antistatic agents, nucleating agents, flame retardants, lubricants, impact reinforcing agents, fluorescent brightening agents, ultraviolet absorbers, pigments and dyes.

The method for preparing the article may comprising the steps of mixing the copolycarbonate according to the present invention and additives such as antioxidants using a mixer, extrusion-molding the mixture with an extruder to produce a pellet, drying the pellet and then injecting the dried pellet with an injection molding machine.

Advantageous Effects

As set forth above, according to the present invention, the copolycarbonate in which a specific siloxane compound is introduced in a main chain of the polycarbonate has effects of improving impact strength at room temperature, impact strength at low temperature, and melt index properties.

DETAILED DESCRIPTION OF THE EMBODIMENTS

Below, preferred embodiments will be provided in order to assist in the understanding of the present disclosure. However, these examples are provided only for illustration of the present invention, and should not be construed as limiting the present invention to these examples.

Preparation Example 1: Preparation of Polyorganosiloxane (AP-30)

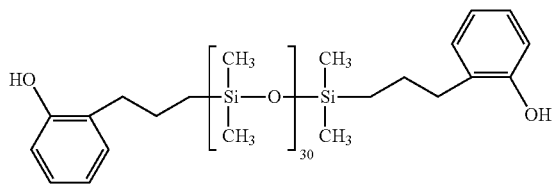

42.5 g (142.8 mmol) of octamethylcyclotetrasiloxane and 2.26 g (16.8 mmol) of tetramethyldisiloxane were mixed. The mixture was then placed in 3 L flask together with 1 part by weight of an acid clay (DC-A3) relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the unmodified polyorganosiloxane thus prepared was 30 when confirmed through $^1$H NMR.

To the resulting terminal-unmodified polyorganosiloxane, 9.57 g (71.3 mmol) of 2-allylphenol and 0.01 g (50 ppm) of Karstedt's platinum catalyst were added and reacted at 90° C. for 3 hours. After completion of the reaction, the unreacted polyorganosiloxane was removed by conducting evaporation under the conditions of 120° C. and 1 torr. The terminal-modified polyorganosiloxane thus prepared was pale yellow oil and the repeating unit (n) was 30, and further purification was not required. The preparation thereof was confirmed through $^1$H NMR and this was designated as AP-30.

Preparation Example 2: Preparation of Polyorganosiloxane (AP-60)

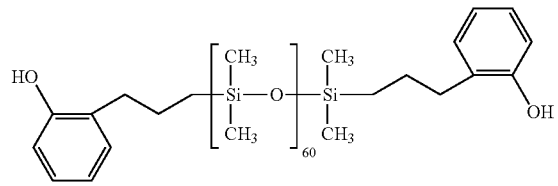

57.5 g (193.2 mmol) of octamethylcyclotetrasiloxane and 2.26 g (16.8 mmol) of tetramethyldisiloxane were mixed. The mixture was then introduced in 3 L flask together with 1 part by weight of an acid clay (DC-A3) relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the unmodified polyorganosiloxane thus prepared was 60 when confirmed through $^1$H NMR.

To the resulting terminal-unmodified polyorganosiloxane, 7.07 g (60.6 mmol) of 2-allylphenol and 0.01 g (50 ppm) of Karstedt's platinum catalyst were added and reacted at 90° C. for 3 hours. After completion of the reaction, the unreacted polyorganosiloxane was removed by conducting evaporation under the conditions of 120° C. and 1 torr. The terminal-modified polyorganosiloxane thus prepared was pale yellow oil, the repeating unit (n) was 60, and further purification was not required. The preparation thereof was confirmed through $^1$H NMR and this was designated as AP-60.

Preparation Example 3: Preparation of Polyorganosiloxane (MB-30)

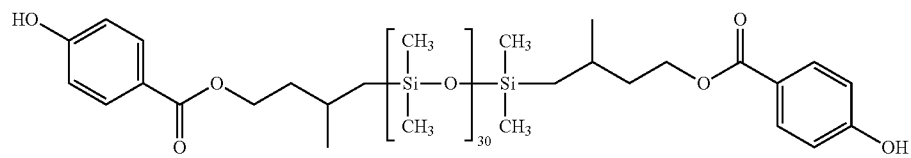

The polyorganosiloxane was prepared in the same manner as in Preparation Example 1, except that 3-methylbut-3-enyl 4-hydroxybenzoate (14.7 g) was used instead of 2-allyphenol, and the repeating unit (m) was 30, which was confirmed through ¹H NMR and designated as MB-30.

Preparation Example 4: Preparation of Polyorganosiloxane (MB-60)

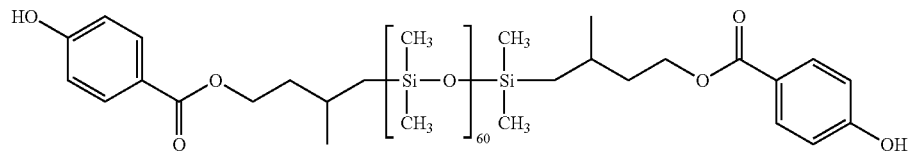

The polyorganosiloxane was prepared in the same manner as in Preparation Example 2, except that 3-methylbut-3-enyl 4-hydroxybenzoate (10.8 g) was used instead of 2-allyphenol, and the repeating unit (m) was 60, which was confirmed through ¹H NMR and designated as MB-60.

Preparation Example 5: Preparation of Polyorganosiloxane (Eu-30)

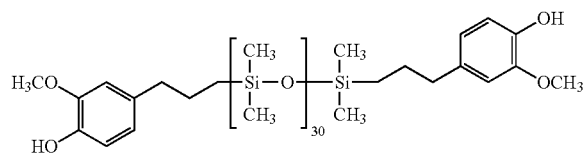

The polyorganosiloxane was prepared in the same manner as in Preparation Example 1, except that Eugenol (11.7 g) was used instead of 2-allyphenol, and the repeating unit (l) was 30, which was confirmed through ¹H NMR and designated as Eu-30.

Preparation Example 6: Preparation of Polyorganosiloxane (Eu-60)

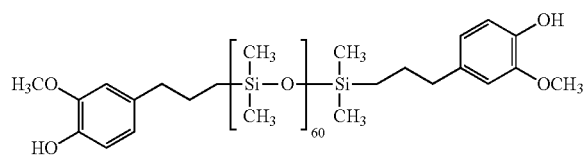

The polyorganosiloxane was prepared in the same manner as in Preparation Example 2, except that Eugenol (8.7 g) was used instead of 2-allyphenol, and the repeating unit (l) was 60, which was confirmed through ¹H NMR and designated as Eu-60.

Example 1-1

1) Preparation of Copolycarbonate Resin 978.4 g of Bisphenol A (BPA), 1,620 g of NaOH 32% aqueous solution, and 7,500 g of distilled water were added to 20 L glass reactor. After confirming that BPA was completely dissolved under nitrogen atmosphere, 3,670 g of methylene chloride, 18.3 g of p-tert-butylphenol, and 55.2 g of polyorganosiloxane previously prepared (mixture of 80 wt. % of polyorganosiloxane (AP-30) of Preparation Example 1 and 20 wt. % of polyorganosiloxane (MB-30) of Preparation Example 3) were added and mixed. To this mixture, 3,850 g of methylene chloride in which 542.5 g of triphosgene was dissolved was added dropwise for one hour. At this time, a NaOH aqueous solution was maintained at pH 12. After completion of the dropwise addition, the reaction product was aged for 15 minutes, and 195.7 g of triethylamine was dissolved in methylene chloride and added. After 10 minutes, pH was adjusted to 3 with 1N aqueous hydrochloric acid solution and then washed three times with distilled water. Subsequently, the methylene chloride phase was separated, and then precipitated in methanol to give a copolycarbonate resin in the form of a powder. The molecular weight of the resulting copolycarbonate resin was measured by GPC using PC Standard and the result confirmed that the weight average molecular weight was 28,100 g/mol.

2) Preparation of Injection Specimen

To the copolycarbonate resin prepared above, 0.050 parts by weight of tris(2,4-di-tert-butylphenyl)phosphite, 0.010 parts by weight of octadecyl-3-(3,5-di-tert-butyl-4-hydroxyphenyl)propionate, and 0.030 parts by weight of pentaerythritoltetrastearate were added, and the resulting mixture was pelletized using a Φ30 mm twin screw extruder provided with a vent. Thereafter, a specimen was injection-molded at a cylinder temperature of 300° C. and a mold temperature of 80° C. using an injection molding machine N-20C (manufactured by JSW, Ltd.)

Examples 1-2 to 6-4 and Comparative Examples 1 to 6

The copolycarbonate resin and its injection-molded specimen were prepared in the same method as in Example 1-1, except that the kind and content of polyorganosiloxane was used as shown in Table 1 below. In Table 1, Comparative Examples 1 to 6 show that one kind of polyorganosiloxane was used.

TABLE 1

|  | Preparation Example 1 (AP-30) 20 wt % | Preparation Example 2 (AP-60) 20 wt % | Preparation Example 3 (MB-30) 20 wt % | Preparation Example 4 (MB-60) 20 wt % | Preparation Example 5 (Eu-30) 20 wt % | Preparation Example 6 (Eu-60) 20 wt % |
|---|---|---|---|---|---|---|
| Preparation Example 1 (AP-30) 80 wt % | Comparative Example 1 | — | Example 1-1 | Example 1-2 | Example 1-3 | Example 1-4 |
| Preparation Example 2 (AP-60) 80 wt % | — | Comparative Example 2 | Example 2-1 | Example 2-2 | Example 2-3 | Example 2-4 |
| Preparation Example 3 (MB-30) 80 wt % | Example 3-1 | Example 3-2 | Comparative Example 3 | — | Example 3-3 | Example 3-4 |
| Preparation Example 4 (MB-60) 30 wt % | Example 4-1 | Example 4-2 | — | Comparative Example 4 | Example 4-3 | Example 4-4 |
| Preparation Example 5 (Eu-30) 80 wt % | Example 5-1 | Example 5-2 | Example 5-3 | Example 5-4 | Comparative Example 5 | — |
| Preparation Example 6 (Eu-60) 80 wt % | Example 6-1 | Example 6-2 | Example 6-3 | Example 6-4 | — | Comparative Example 6 |

Comparative Example 7

The polycarbonate resin and its injection-molded specimen were prepared in the same method as in Example 1, except that the polyorganosiloxane was not used.

Experimental Example: Evaluation of Physical Properties

The physical properties of the copolycarbonate specimens prepared in the examples and of the polycarbonate specimens prepared in the comparative examples were determined in the following manner and the results were shown in Tables 2 to 4 below.

Weight average molecular weight (g/mol): measured by PC Standard using Agilent 1200 series.
Melt Index (MI): measured in accordance with ASTM D 1238 (conditions of 300° C. and 1.2 kg).
Impact strength at room temperature and impact strength at low temperature (J/m): measured at 23° C. and −30° C. in accordance with ASTM D256 (⅛ inch, Notched Izod).
Repeating unit: determined by $^1$H-NMR using Varian 500 MHz.

TABLE 2

| Example Number | Impact strength at room temperature (23° C., J/m) | Impact strength at low temperature (−30° C., J/m) | Melt index (MI) (g/10 min) | Weight average molecular weight (Mw, g/mol) |
|---|---|---|---|---|
| Example 1-1 | 663 | 210 | 15 | 28,100 |
| Example 1-2 | 823 | 711 | 11 | 29,500 |
| Example 1-3 | 480 | 120 | 16 | 27,800 |
| Example 1-4 | 531 | 180 | 17 | 27,500 |
| Comparative Example 1 | 561 | 115 | 18 | 26,800 |
| Example 2-1 | 632 | 480 | 13 | 29,300 |
| Example 2-2 | 780 | 695 | 9 | 30,900 |
| Example 2-3 | 610 | 435 | 12 | 28,800 |
| Example 2-4 | 635 | 448 | 14 | 28,300 |
| Comparative Example 2 | 713 | 630 | 7 | 30,900 |

TABLE 3

| Example Number | Impact strength at room temperature (23° C., J/m) | Impact strength at room temperature (23° C., J/m) | Melt index (MI) (g/10 min) | Weight average molecular weight (Mw, g/mol) |
|---|---|---|---|---|
| Example 3-1 | 266 | 266 | 25 | 25,900 |
| Example 3-2 | 528 | 528 | 16 | 27,100 |
| Example 3-3 | 218 | 218 | 26 | 25,800 |
| Example 3-4 | 323 | 323 | 20 | 26,300 |
| Comparative Example 3 | 443 | 443 | 18 | 26,800 |
| Example 4-1 | 618 | 618 | 15 | 27,800 |
| Example 4-2 | 590 | 590 | 14 | 28,500 |
| Example 4-3 | 448 | 448 | 20 | 26,500 |
| Example 4-4 | 438 | 438 | 16 | 26,900 |
| Comparative Example 4 | 486 | 486 | 14 | 27,500 |

TABLE 4

| Example Number | Impact strength at room temperature (23° C., J/m) | Impact strength at low temperature (−30° C., J/m) | Melt index (MI) (g/10 min) | Weight average molecular weight (Mw, g/mol) |
|---|---|---|---|---|
| Example 5-1 | 480 | 261 | 17 | 27,100 |
| Example 5-2 | 528 | 463 | 13 | 28,100 |

TABLE 4-continued

| Example Number | Impact strength at room temperature (23° C., J/m) | Impact strength at low temperature (−30° C., J/m) | Melt index (MI) (g/10 min) | Weight average molecular weight (Mw, g/mol) |
|---|---|---|---|---|
| Example 5-3 | 231 | 136 | 22 | 25,300 |
| Example 5-4 | 665 | 593 | 14 | 30,100 |
| Comparative Example 5 | 124 | 117 | 33 | 25,100 |
| Example 6-1 | 650 | 499 | 17 | 27,900 |
| Example 6-2 | 703 | 580 | 12 | 28,500 |
| Example 6-3 | 689 | 615 | 14 | 30,000 |
| Example 6-4 | 765 | 638 | 9 | 31,800 |
| Comparative Example 6 | 659 | 636 | 7 | 31,300 |
| Comparative Example 7 | 660 | 116 | 14 | 27,500 |

The invention claimed is:

1. A copolycarbonate comprising:
1) a repeating unit represented by Chemical Formula 2 and a repeating unit represented by Chemical Formula 3, and
2) a repeating unit represented by the following Chemical Formula 4,
wherein the copolycarbonate has a weight average molecular weight of 1,000 to 100,000 g/mol:

[Chemical Formula 2]

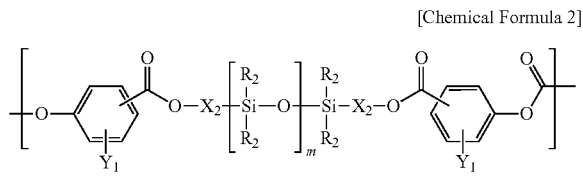

in Chemical Formula 2,
each of $X_2$ is independently $C_{1-10}$ alkylene,
each of $Y_1$ is independently hydrogen, $C_{1-6}$ alkyl, halogen, hydroxy, alkoxy or $C_{6-20}$ aryl,
each of $R_2$ is independently hydrogen; or $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
m is an integer of 10 to 200,

[Chemical Formula 3]

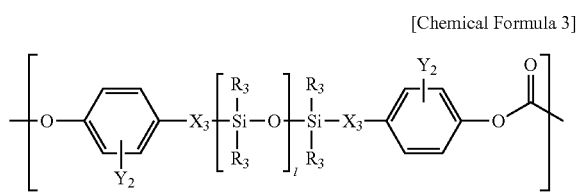

in Chemical Formula 3,
each of $X_3$ is independently $C_{1-10}$ alkylene,
each of $Y_2$ is independently $C_{1-10}$ alkoxy,
each of $R_3$ is independently hydrogen; or $C_{1-15}$ alkyl unsubstituted or substituted with oxiranyl, oxiranyl-substituted alkoxy, or $C_{6-20}$ aryl; halogen; $C_{1-10}$ alkoxy; allyl; $C_{1-10}$ haloalkyl; or $C_{6-20}$ aryl, and
l is an integer of 10 to 200,

[Chemical Formula 4]

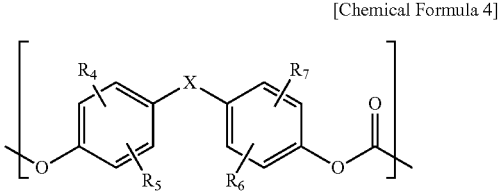

in Chemical Formula 4,
X is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO, and
$R_4$, $R_5$, $R_6$ and $R_7$ are each independently hydrogen, $C_{1-10}$ alkyl, $C_{1-10}$ alkoxy, or halogen.

2. The copolycarbonate of claim 1, wherein $R_1$, $R_2$ and $R_3$ are each independently $C_{1-6}$ alkyl.

3. The copolycarbonate of claim 1, in n, m and l are each independently an integer of 30 to 60.

4. The copolycarbonate of claim 1, wherein a weight ratio between the repeating unit represented by Chemical Formula 2 and the repeating unit represented by Chemical Formula 3 is 1:99 to 99:1.

5. The copolycarbonate of claim 1, wherein Chemical Formula 2 is represented by the following Chemical Formula 2-1:

[Chemical Formula 2-1]

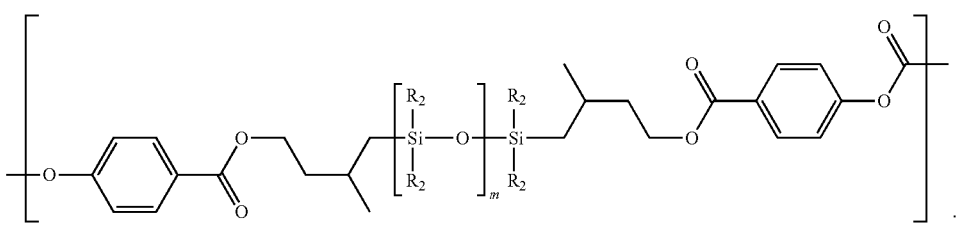

6. The copolycarbonate of claim 1, wherein Chemical Formula 3 is represented by the following Chemical Formula 3-1:

[Chemical Formula 3-1]

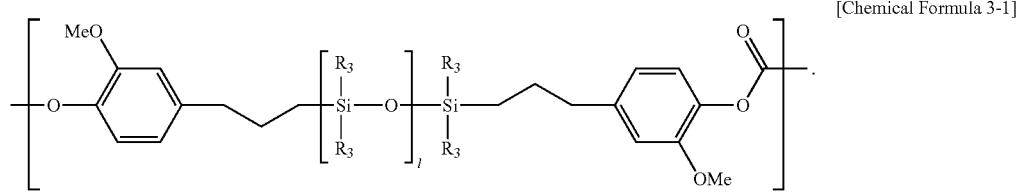

7. The copolycarbonate of claim 1, wherein the repeating unit represented by Chemical Formula 4 is derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, and bis(4-hydroxyphenyl)diphenylmethane.

8. The copolycarbonate of claim 1, wherein Chemical Formula 4 is represented by the following Chemical Formula 4-1:

[Chemical Formula 4-1]

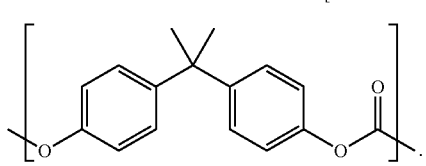

9. The copolycarbonate of claim 1, wherein the copolycarbonate has a weight average molecular weight of 15,000 to 40,000 g/mol.

10. A polycarbonate composition comprising:
a polycarbonate; and
the copolycarbonate of claim 1.

11. The polycarbonate composition of claim 10, therein a polysiloxane structure is not introduced in a main chain of the polycarbonate.

12. The polycarbonate composition of claim 10, wherein the polycarbonate comprises a repeating unit represented b e following Chemical Formula 5:

[Chemical Formula 5]

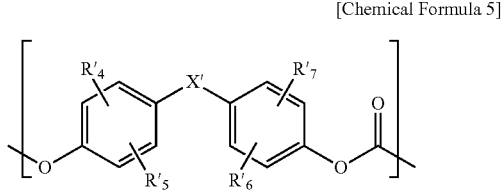

in Chemical Formula 5,
$R_4$, $R_5$, $R_6$ and $R_7$ are each independently hydrogen, $C_{1-10}$ alkyl, $C_{1-10}$ alkoxy, or halogen,
X' is $C_{1-10}$ alkylene unsubstituted or substituted with phenyl, $C_{3-15}$ cycloalkylene unsubstituted or substituted with $C_{1-10}$ alkyl, O, S, SO, $SO_2$ or CO.

13. The polycarbonate composition of claim 10, wherein a weight ratio of the copolycarbonate and the polycarbonate is from 99:1 to 1:99.

* * * * *